United States Patent [19]

Ohshima et al.

[11] 3,956,526

[45] May 11, 1976

[54] METHOD OF MAKING A PHOTOCONDUCTIVE LAYER FOR AN IMAGE CONVERTING PANEL

[75] Inventors: Nobumasa Ohshima, Hirakata; Kinya Himeno, Nara; Norihiro Tani; Yoshio Enoki, both of Katano, all of Japan

[73] Assignee: Matsushita Electric Industrial Co., Ltd., Japan

[22] Filed: June 20, 1973

[21] Appl. No.: 371,661

[30] Foreign Application Priority Data

June 26, 1972 Japan .............................. 47-64368

[52] U.S. Cl. .................................... 427/73; 96/1.5; 96/1.8; 250/315 A; 427/65; 427/160; 427/372

[51] Int. Cl.$^{2}$ .................... G03G 5/05; G01D 15/14

[58] Field of Search ............... 96/1.5, 1.8; 117/201, 117/218, 34; 427/73, 372, 65; 250/315 A

[56] References Cited

UNITED STATES PATENTS

| | | | |
|---|---|---|---|
| 2,287,348 | 6/1942 | Hayden | 96/1.8 |
| 3,121,006 | 2/1964 | Middleton et al. | 96/1.5 |
| 3,368,893 | 2/1968 | Garrett | 96/1.8 X |
| 3,595,691 | 7/1971 | Verhille et al. | 117/201 |
| 3,704,122 | 11/1972 | Yamaguchi et al. | 96/1.8 |
| 3,756,843 | 9/1973 | Honjo et al. | 117/34 |

OTHER PUBLICATIONS

Harazaki et al., "Photoelectric Properties of Electrofax Paper in Relation to Its Preparation", J. Chem. Soc. Japan, Ind. Chem. Sect., 66, No. 4, pp. 432–434 (1963).

*Primary Examiner*—David Klein
*Assistant Examiner*—John R. Miller
*Attorney, Agent, or Firm*—Wenderoth, Lind & Ponack

[57] ABSTRACT

A photoconductive layer having superior characteristics is made by steps of suspending uniformly photoconductive particles in a viscous solution by stirring, pouring the stirred mixture of the photoconductive particles, binder and solvent on a substrate which is put horizontally at a bottom of a container, precipitating the photoconductive particles on the surface of the substrate so as to form a wet photoconductive layer, removing the clear solution on the wet photoconductive layer, drying the wet photoconductive layer and baking the dried photoconductive layer.

7 Claims, 4 Drawing Figures

METHOD OF MAKING A PHOTOCONDUCTIVE LAYER FOR AN IMAGE CONVERTING PANEL

BACKGROUND OF THE INVENTION

This invention relates to a method of making a photoconductive layer, and especially to a method of making a photoconductive layer having a high photosensitivity and a high uniformity.

There are known in the art several methods for making the photoconductive layer, such as the sintering method, evaporation method and dispersion method. However, these conventional methods are not satisfactory for providing a photoconductive layer which can be used for a practical device such as an image converting panel for converting a pattern of radiations into a visible image.

For example, in order to provide a photoconductive layer of a considerable size and thickness, there is suitably used the conventional dispersion method, in which the photoconductive material in powdered form is uniformly dispersed in a binder and a suitable solvent is added thereto. Then, the mixture is applied by the screen method or squeezing method, and after that it is dried and hardened. In this case, in order to make the powder of the activated photoconductive material photosensitive, it is necessary that the powder have considerable grain size, such as one to several microns or higher than 10 microns in many cases. Further, as the photosensitivity is decreased according to increase of the amount of the binder, the amount of the binder is limited. Moreover, since the photosensitivity is apt to decrease by mixing to the extent needed for dispersing the powder uniformly, it is not mixed enough. Therefore, when using such conventional solution, there are several disadvantages such as non-uniformity and poor reproducibility of the resultant layer. Thus for the device using such photoconductive layer, this causes poor picture quality, resolution and photosensitivity, and poor reproducibility of the characteristics and low yield of the device, especially for the device using a layer size panel.

SUMMARY OF THE INVENTION

Therefore, an object of the present invention is to provide a novel and improved method of making a photoconductive layer having a high photosensitivity for incident radiation.

Another object of the invention is to provide a novel method of making a resin-combined type photoconductive layer which has a large thickness and a large size with highly uniform surface and well-filled inside.

A further object of the invention is to provide a method of making a resin-combined type photoconductive layer having high reliability of electric characteristics and high manufacturing reproducibility.

A further object of the invention is to provide a novel method for easily and simply making a resin-combined type photoconductive layer having superior characteristics.

These objects are achieved by providing the method of making the photoconductive layer according to the present invention, which comprises steps of uniformly suspending photoconductive particles in a viscous solution by stirring, said viscous solution comprising a binder for combining said photoconductive particles and a solvent; putting a substrate on which the photoconductive layer is to be formed horizontally at the bottom of a container; pouring the stirred viscous mixture of said photoconductive particles, said binder and said solvent into said container; precipitating said photoconductive particles on the surface of said substrate in said viscous solution so as to form a wet photoconductive layer on said substrate; removing the clear solution on said wet photoconductive layer to the outside of said container; drying said wet photoconductive layer; and baking the dried photoconductive layer.

BRIEF DESCRIPTION OF THE DRAWINGS

These and other objects, features and advantages of the invention will become apparent from consideration of the following detailed description of the invention together with the accompanying drawings wherein.

DETAILED DESCRIPTION OF THE PREFERRED EMBODIMENT

Figure 1:
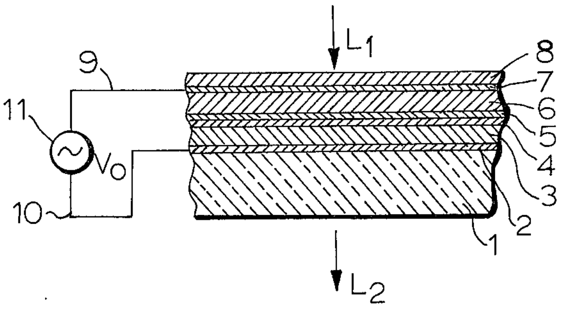
FIG. 1 is a sectional view of an image converting panel comprising a photoconductive layer which is provided according to the method of the invention, as an embodiment of application of the invention.

FIG. 1 shows a sectional view of an image converting panel, which is known in the art, for converting a pattern of radiations into a visible image, as an example of a device in which the photoconductive layer used is made by the method of the invention. The device shown in FIG. 1 comprises a transparent substrate designated by a reference numeral 1, a transparent electrode 2, an electroluminescent layer 3, a reflective layer 4, an opaque layer 5, a photoconductive layer 6, a radiation permeable electrode 7 and a covering layer 8 having a high resistance to humidity, in the recited order from the bottom to the top.

Under A.C. boltage $V_0$ applied across the electrodes 2 and 7 through lead wires 9 and 10, respectively, from an electric power source 11, when an X-ray input $L_1$ is projected on the photoconductive layer 6 through the covering layer 8 and the radiation permeable electrode 7, there is provided a converted visible image $L_2$ on the surface of the electroluminescent layer 3.

A photoconductive layer used herewith means all of the layers which cause photoconductivity by electromagnetic radiations such as visible light, infrared light, ultraviolet light, X-ray, $\gamma$-ray, cathode ray, etc.

Operable photoconductive particles in the method of the inventin includes photoconductive II–VI compounds such as CdS:Cu, Cl, CdSe:Cu, Cl, CdS:Ag, Cl and CdSe:Ag, Cl and mixtures thereof and metal oxides such as ZnO, $SnO_2$ and $Cu_2O$. The photosensitivity of these materials largely depends on the factors such as their particle size, the kind of the binder used for combining the particles and solvent, the concentration and temperature of the solution, the suspending method, the drying condition and the baking condition, etc. By photosensitivity is meant by the ratio of photocurrent to dark current of the photoconductive layer.

The photoconductive layer having a high photosensitivity is prepared by using large-size photoconductive particles. The conventional photoconductive particles have the average diameter of 1 to 20 microns. Although the layer is much improved in uniformity by using the fine photoconductive particles, the photosensitivity of the resultant photoconductive layer becomes low. Therefore, according to the present invention, the precipitating method is used to obtain the resin-combined type photoconductive layer having a high photosensitivity and a high uniformity with a large thickness and a high density of photoconductive particles in spite of using the large size photoconductive particles.

For making the resin-combined type photoconductive layer, it is necessary to use the viscous solution of a comparatively high concentration, and usually in such a viscous solution it is very difficult to naturally suspend the photoconductive particles uniformly. Therefore, in the precipitating method according to the invention, the photoconductive particles are previously suspended uniformly in the viscous solution comprising the large size photoconductive particles, binder for combining the particles and solvent. Then, the mixture is poured on the substrate, so that the photoconductive particles precipitate uniformly on the substrate and there is provided a resin-combined type photoconductive layer of a large area with high uniformity and high density.

Further, when previously suspending the photoconductive particles, it is desired to suspend the particles effectively into the viscous solution. Usually, there is used a roll-milling method for suspending the particles into the solution. However, for the photoconductive particles, such a method is disadvantageous because most of the photoconductive particles are divided separately at the gap of the rollers and the thin photoconductive layer on each particle is perfectly pared, so that the photosensitivity of the resultant layer is decreased remarkably. Accordingly, in the method of the invention, the photoconductive particles are suspended by a stirring method, i.e., by stirring the photoconductive particles in the viscous solution with using a mixer such as steel blades. Since the friction among the particles is much less than that of the roll-milling method, the thin photoconductive layer on each particle is not damaged much, and the photoconductive particles are suspended uniformly in the viscous solution without decreasing the photosensitivity.

The photoconductive particles are suronded with a low photosensitive layer at the outermost portion and with a high photosensitive layer at the slightly inner portion. Therefore, by selecting the condition of stirring the mixture, it is possible to make that high photosensitive layer appear at the surface of the photoconductive particles, so that the resultant photoconductive layer is provided with a high photosensitivity. For stirring, there is usually employed a mixer of the type used at home, which has four steel blades and rotates 8000 to 12,000 turns every minute.

Usually, a better effect is obtained at stirring the particles for 15 sec. to 20 minutes, though the optimum time depends on the lot of the photoconductive particles. When the suspending time is too short, although the linear relation between the dark current and the voltage is maintained up to a high electric field of about 800 v/mm, the photocurrent becomes very little. When the suspending time is too long, the photocurrent increases remarkably, but the above mentioned linear relation is not maintained up a high electric field, and so the photosensitivity of the photoconductive layer decreases.

Figure 2:
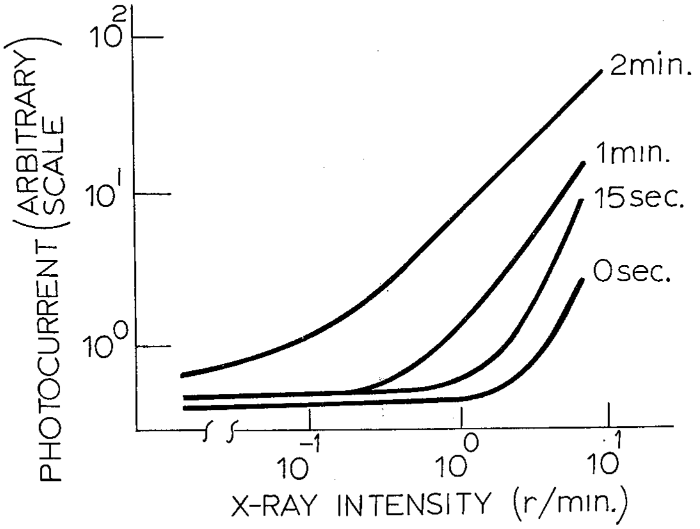
FIG. 2 shows the relation between X-ray input intensity and photocurrent of the photoconductive layer for various stirring times.

FIG. 2 shows the relation between the X-ray input intensity and the photocurrent of the photoconductive layer for various stirring times.

As well known, the photoconductive powder is very sensitive to the kind of the binder used in the photoconductive layer. Some binders cause chemical and physical undesirable effects in the photoconductive powder. For example, if the heat curing resin such as an epoxy and urea resin is used for the binder, the photosensitivity of the photoconductive powder is reduced quickly. According to the inventors' experiments, it is found that in the method of the present invention a cellulose resin such as ethylcellulose, cyanoethylcellulose, cyanoethyl sucrose, etc., is suitable for the binder combining the photoconductive particles without reducing the photosensitivity.

Figure 3:
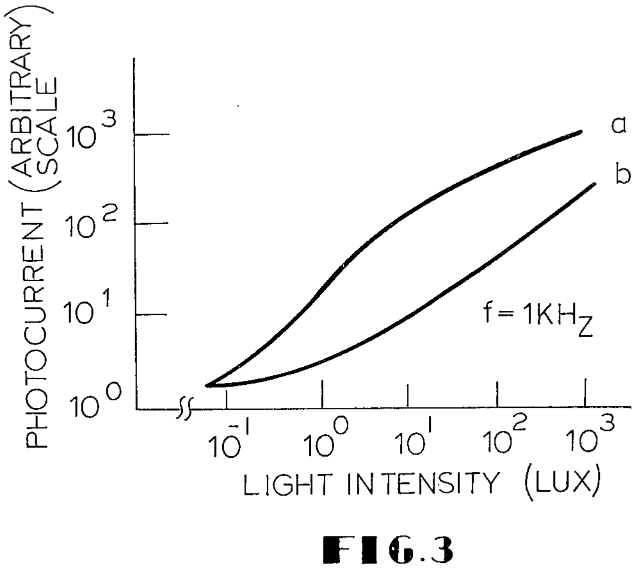
FIG. 3 shows the relation between X-ray input intensity and photocurrent for different binders.

FIG. 3 shows the relation between the intensity of X-ray input and the photocurrent of the photoconductive layer for the binder of ethylcellulose and epoxy resin, with curves *a* and *b*, respectively. It is clear from the figure that the photoconductive layer combined by ethylcellulose is superior to that of epoxy resin.

Further, some solvent causes undesirable effects to the photoconductive particles. According to the inventors' many experiments, it is found that the preferable organic solvents include toluene, xylene, n-butyl-acetate, ethyl alcohol, isoamyl alcohol, isopropyl alcohol, etc. By using such an organic solvent, the photosensitivity of the photoconductive powder is improved or at least it is maintained.

The amount of the binder mixed with solvent also remarkably affects the photoconductive powder. The preferable amount of the binder is 0.5 to 5 percent. When the concentration of the binder is less than 0.5 percent, it is very difficult to obtain the strongly combined photoconductive layer, and the resultant photoconductive layer is very weak with respect to mechanical shock because the photoconductive layer is not combined strongly. When the concentration of the binder is more than 5 percent, the resultant photoconductive layer has inferior electrical properties because in accordance with the increase of the concentration, the linear relation between the dark current and the applied voltage is not maintained up through a high electric field, and so finally the photosensitivity of the photoconductive layer is reduced. Moreover, according to increase of the concentration of the binder, the photoconductive particles precipitate slowly, and much time is required in order to complete precipitation of all particles.

It is preferable that the solution be kept at a temperature of 15° to 40°C. At the temperature outside this range, the suspending conditions of the photoconductive particles are shifted, and it becomes difficult to retain the performance reliability and the reproducibility of the photoconductive layer.

In case of the image converting panel shown in FIG. 1, the photoconductive layer is formed on the substrate 1 such as a transparent glass plate or a transparent ceramic plate on which there are formed, in the order from the bottom up, the transparent electrode, the electroluminescent layer, the reflective layer and the opaque layer. Each layer is prepared as follows: The transparent electrode is a tin oxide film chemically deposited on the transparent substrate. The electroluminescent layer essentially consists of electroluminescent powder such as activated ZnS and a binder such as urea resin. The operable thickness of the electroluminescent layer is about 60 microns. The reflective layer is prepared by applying, on the electroluminescent layer, a paint comprising barium titanate powder having particle size of from 0.5 to 5 microns and a binder such as urea resin in a solvent such as xylol or butanol. The opaque layer is prepared by applying, on the reflective layer, a paint comprising carbon black powder and a binder such as epoxy resin in a solvent such as butanol and methyl-ethyl ketone.

The above mentioned suspended mixture is poured on the substrate put on the bottom of the container horizontally. It is better to pour the mixture across the dividing plates forming many tetragonal cells. The photoconductive particles precipitate slowly on the substrate and form the uniform and well-filled thick photoconductive layer in the solution. The precipitating time depends on the size of the photoconductive particles, and it lies in the range of 20 minutes to 10 hours. The thickness of the photoconductive layer is adjusted according to the amount of the photoconductive particles added in the mixture, and it lies in the range of 300 to 600$\mu$.

After most of the photoconductive particles finish precipitating, the clear solution is completely removed. The quality of the produced photoconductive layer is easily affected by the drying conditions because the thickness of the photoconductive layer is very large and much of the binder is contained therein. If the photoconductive layer is exposed to the flowing air, the surface of the photoconductive layer is dried faster than the inside thereof, and so cracking and exfoliation from the substrate results. These problems do not occur for a thin photoconductive layer of less than 150$\mu$. Therefore, the obtained wet photoconductive layer should be slowly dried in the atmosphere saturated by solvent vapor, and the solvent remaining in the photoconductive layer is removed by retaining it at a pressure of 400 to 700 mmHg for several hours. If the photoconductive layer half-dried is subjected to pressure of less than 400 mmHg, the solvent remaining in the binder and the portion near to the bottom of the photoconductive layer is vaporized abruptly, and there is also caused the partial exfoliation of the photoconductive layer from the substrate. Also, if the photoconductive layer wich is half-dried is subjected to a pressure of more than 700 mmHg, the remaining solvent in the photoconductive layer is not completely removed.

Then, the dried photoconductive layer is baked in a forced air oven at a temperature of 60° to 160°C for 30 to 120 minutes. If the photoconductive layer is baked at the temperature of more than 160°C, the binder in the photoconductive layer vaporizes, melts or is carbonized partially, and as a result the characteristics of the resultant photoconductive layer is damaged markedly.

As understood from the description represented hereinbefore, according to the method of the present invention of making the photoconductive layer, there are provided many advantages as follows:

1. The high photosensitive, uniform and dense photoconductive layer can be obtained without reduction of the primary electrical characteristics, independent of unskilled personnel and irregularities in manufacturing.

2. For a device such as the image converting panel using such a photoconductive layer, characteristics such as clarity, resolution, brightness and photosensitivity of the reproduced image can be greatly improved.

3. There is provided the resin-combined type photoconductive layer having superior characteristics by using the precipitating method and cellulose resin as a binder.

4. By using precipitating method, the photoconductive layer having a very even and dense surface can be obtained easily.

5. There is provided the thick and uniform photoconductive layer, and further it is easy to adjust the thickness of the layer.

By using the precipitating method, the photoconductive particles precipitate in order of the size of the particle from the surface of the substrate to the top of the photoconductive layer. That is, the top portion of the resultant photoconductive layer is filled with the smallest particles. Consequently, the surface of the produced photoconductive layer becomes very even and highly dense. This is very advantageous because at forming the electrode by applying the thin aluminum on the surface of the photoconductive layer, the electrode does not sink into the photoconductive layer. Therefore, in case of the image converting panel of FIG. 1, the distance between the radiation permeable electrode and the transparent electrode becomes almost equal over the whole range. Accordingly, there is never caused the partial breakdown of the photoconductive layer, and so the breakdown voltage and the life of the image converting panel can be much improved. Further, even when increasing the applied voltage, the dark brightness of the panel, i.e., the brightness without radiation, can be kept at a low level and the maximum brightness of the image, i.e., the brightness under radiation, is improved greatly, and so the contrast and clarity of the image are increased. In the following example, an embodiment of the invention is described.

EXAMPLE

A substrate 1 of 200×150 mm in size is set horizontally on the bottom of a container of 220 mm in width, 170 mm in depth and 160 mm in inside height. On the substrate, there are formed the following layers in the order from the bottom up: A transparent electrode 2 consisting of tin oxide; an electroluminescent layer 3 of 60 microns in thickness consisting of powdered activated ZnS and a cellulose binder; a reflective layer 4 of 10 microns in thickness consisting of barium titanate powder and a urea resin binder; and an opaque layer 5 of 10 microns in thickness consisting of carbon powder and an epoxy resin binder.

Then, a mixture shown in Table 1 is stirred by a mixer (Model MX-120 made by Matsushita Electric Industrial Co., Ltd. in Japan, rotating speed: 10,000 per minute) for 2 minutes, and the stirred mixture is poured on the substrate mentioned above across the dividing plates comprising aluminum plates of 0.4 mm in thickness and forming many tetragonal cells having a size of 50×50 mm.

Table 1

| Combination of mixture and solution | | |
|---|---|---|
| 1. | Solution | |
| | ethyl/cellulose (standard 100 cps made by Dow Chemical Co) | 12.5 g |
| | Xylene | 500 g |
| | n-Butyl-acetate | 500 g |
| 2. | Activated CdSe: Cu, Cl | 40 g |

Table 1-continued

| Combination of mixture and solution | |
|---|---|
| Solution | 1800 cc |

After 60 minutes, most of the photoconductive particles finish precipitating, and the clear solution is removed to the outside of the container. Then the cap having many small holes is put on the container, and the substrate having the wet photoconductive layer formed thereon is allowed to rest for 2 hours under the irradiation of an infrared lamp (100 V, 100 W) in the atmosphere saturated by solvent vapor.

Next, the substrate having now the dried photoconductive layer thereon is put in air pressure of 400 to 700 mmHg, and it is allowed to rest for 2 hours. Then, it is baked in the forced air oven at a temperature of 130°C for 40 minutes.

Finally, the following layers are integrated on the resultant photoconductive layer in the order from the bottom up; a radiation permeable electrode 7 consisting of a uniformly evaporated aluminum film and a covering layer 8 consisting of silicon resin.

When AC voltage from a voltage source 11 is supplied across the radiation permeable electrode 7 and the transparent electrode 2 through lead wires 9 and 10, and when an X-ray image $L_1$ is projected on the photoconductive layer 6 through the covering layer 8 and the radiation permeable electrode 7, the electroluminescent layer 3 shows a converted visible image $L_2$ on the surface thereof.

Figure 4:
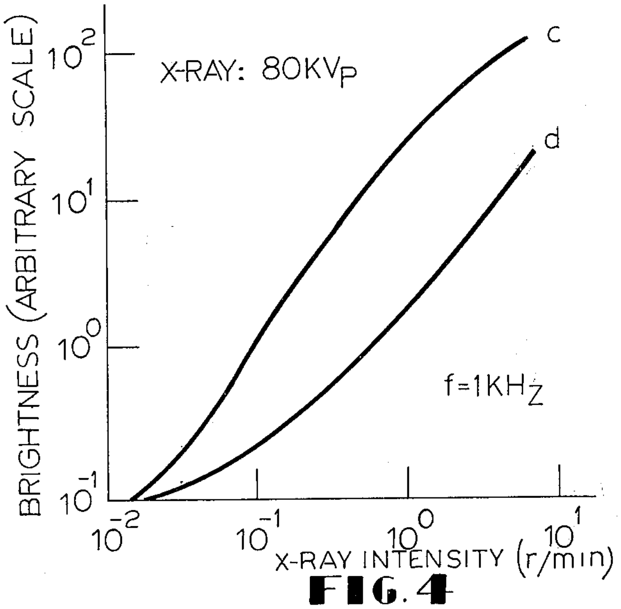
FIG. 4 shows the relation between X-ray input intensity and brightness for a photoconductive layer according to the invention and the conventional one.

FIG. 4 shows the relation between the brightness and the X-ray input intensity of the image converting panel for the photoconductive layer according to this invention and for the photoconductive layer manufactured by the squeezing method of painting a mixture of the photoconductive powder and the epoxy resin by the curves *c* and *d*, respectively.

Table 2 show the differences of the characteristics of the image converting panel using the photoconductive layer which is made according to the conventional method and the present invention.

Table 2 Comparison of the characteristics

Table 2

| | Comparison of the characteristics characteristics | | | | | |
|---|---|---|---|---|---|---|
| methods | Brightness at 10R/min incident X-ray (ft-L) | contrast (r) | resolution penetrameter (mm) | applicable voltage (volt, 1 KHz) | equality and clarity of an image | reliability (characteristics) |
| The former method | 0.2–0.4 | ~1.0 | 0.35 ~0.4 | 430 | bad | bad |
| The present invention | 20~25 | 1.5~ | 0.2 ~0.26 | 480 | good (uniform) | good |

It is clear that the image converting panel comprising the photoconductive layer according to this invention has greatly improved brightness and contrast. Further, it has a high quality and a high resolution on the order of 4 to 5 lines pairs/mm and high performance reliability.

The method of making the photoconductive layer according to the present invention is also useful for the other conductive or semiconductive powder.

What is claimed is:

1. A method of making a photoconductive layer for an image converting panel, comprising steps of: uniformly suspending photoconductive particles having an average diameter of 1 to 20 microns in a viscous solution by stirring for 15 seconds to 20 minutes, said viscous solution being kept at a temperature of 15° to 40°C and comprising a cellulose resin as a binder for combining said photoconductive particles and an organic solvent selected from the group consisting of toluene, xylene, n-butyl-acetate, ethyl alcohol, iso-amyl alcohol and iso-propyl alcohol, the concentration of said binder in said solution being 0.5 to 5 percent; putting an electrically conductive substrate, on which the photoconductive layer is to be formed, horizontally at the bottom of a container; pouring the stirred viscous mixture of said photoconductive particles, said binder and said solvent into said container; precipitating said photoconductive particles on the surface of said substrate in said viscous solution so as to form a wet photoconductive layer on said substrate; removing a clear solution on said wet photoconductive layer to the outside of said container; slowly drying said wet photoconductive layer in an atmosphere saturated by vapor of said solvent; and baking the dried photoconductive layer at a temperature of 60° to 160°C, the thickness of the photoconductive layer being 300 to 600 microns.

2. A method of making a photoconductive layer as claimed in claim 1, wherein said binder is ethyl cellulose, cyanoethyl cellulose, cyanoethyl sucrose, or mixture thereof.

3. A method of making a photoconductive layer as claimed in claim 1, wherein said mixture of said photoconductive particles, said binder and said solvent is stirred by a mixer.

4. A method of making a photoconductive layer as claimed in claim 1, wherein said substrate is a glass plate or a ceramic plate having an electrode thereon, or a transparent substrate having a transparent electrode and an electroluminescent layer thereon.

5. A method of making a photoconductive layer as claimed in claim 1, wherein said wet photoconductive layer is dried in saturated solvent vapor for 30 minutes to 2 hours by an infrared lamp and then held in vacuum of 400 to 700 mmHg for 5 to 15 hours.

6. A method of making a photoconductive layer as claimed in claim 5 wherein said dried photoconductive layer is fired at a temperature of 60° to 160°C for 30 to 120 minutes.

7. A method of making a photoconductive layer as claimed in claim 1, wherein said photoconductive particles are CdS or CdSe including as activators, Cu and Cl or Ag and Cl, mixture of CdS and CdSe activated by said activators respectively, or ZnO, $SnO_2$ or $Cu_2O$.

* * * * *